(12) United States Patent
Kondou et al.

(10) Patent No.: US 10,241,686 B2
(45) Date of Patent: Mar. 26, 2019

(54) STORAGE DEVICE, INFORMATION PROCESSING DEVICE, DATA ACCESS METHOD AND PROGRAM

(71) Applicant: Sony Semiconductor Solutions Corporation, Kanagawa (JP)

(72) Inventors: Keitarou Kondou, Tokyo (JP); Makoto Noda, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 14/656,958

(22) Filed: Mar. 13, 2015

(65) Prior Publication Data

US 2015/0277784 A1 Oct. 1, 2015

(30) Foreign Application Priority Data

Mar. 26, 2014 (JP) .................... 2014-063525

(51) Int. Cl.
*G06F 3/06* (2006.01)
*G06F 13/28* (2006.01)

(52) U.S. Cl.
CPC .......... *G06F 3/0613* (2013.01); *G06F 3/0608* (2013.01); *G06F 3/0643* (2013.01); *G06F 3/0659* (2013.01); *G06F 3/0679* (2013.01); *G06F 13/28* (2013.01); *G06F 2206/1014* (2013.01)

(58) Field of Classification Search
CPC .. G06F 17/3007; G06F 3/0679; G06F 3/0656; G06F 3/0643; G06F 2206/1014; G06F 12/0615; G06F 12/0638; G06F 3/0608; G06F 3/0613; G06F 13/28; G06F 3/061; H04B 1/3816; H04W 12/06; H04W 8/183; H04W 8/205
See application file for complete search history.

(56) References Cited

U.S. PATENT DOCUMENTS

| | | | | |
|---|---|---|---|---|
| 2007/0239957 A1* | 10/2007 | Lin | ...................... | G06F 3/0608 711/170 |
| 2008/0244737 A1* | 10/2008 | Hayasaka | ........... | G06F 21/6209 726/21 |
| 2010/0217927 A1* | 8/2010 | Song | ..................... | G06F 3/0616 711/103 |
| 2010/0280995 A1* | 11/2010 | Munegowda | ....... | G06F 11/1435 707/648 |
| 2011/0066837 A1* | 3/2011 | Lee | ...................... | G06F 9/4401 713/2 |

(Continued)

FOREIGN PATENT DOCUMENTS

JP         4736594 B2       7/2011

OTHER PUBLICATIONS

Jiang et al. "uSD: Universal Sensor Data Entry Card" IEEE Transactions on Consumer Electronics, vol. 56, No. 3, Aug. 2010.*

(Continued)

*Primary Examiner* — Ernest Unelus
(74) *Attorney, Agent, or Firm* — Michael Best & Friedrich LLP

(57) ABSTRACT

A storage device includes a recording medium in which data is recorded on a cluster basis, and a memory that stores a file allocation table (FAT) in which disposition information regarding the cluster is recorded.

17 Claims, 8 Drawing Sheets

(56) References Cited

U.S. PATENT DOCUMENTS

| | | | |
|---|---|---|---|
| 2012/0023297 A1* | 1/2012 | Duzly | G06F 12/0638 711/154 |
| 2013/0007354 A1* | 1/2013 | Shiiba | G06F 12/0246 711/103 |
| 2014/0059273 A1* | 2/2014 | Fujimoto | G06F 12/0246 711/103 |
| 2014/0213321 A1* | 7/2014 | Chen | H04M 1/72522 455/558 |
| 2015/0046625 A1* | 2/2015 | Peddle | G11C 16/10 710/308 |

OTHER PUBLICATIONS

"The FAT File System", [online], Internet URL:http://social.technet.microsoft.com/wiki/contents/articles/6771.the-fat-file-system.aspx. Mar. 20, 2014.

\* cited by examiner

FIG. 7

| MEMORY ADDRESS | | CLUSTER NUMBER |
|---|---|---|
| d | | |
| ⋮ | ⋮ | ⋮ |
| d + 2m | 0003 | 2 |
| d + 3m | 0004 | 3 |
| d + 4m | FFFF | 4 |
| ⋮ | ⋮ | ⋮ |

STORAGE DEVICE, INFORMATION PROCESSING DEVICE, DATA ACCESS METHOD AND PROGRAM

CROSS REFERENCE TO RELATED APPLICATIONS

This application claims the benefit of Japanese Priority Patent Application JP 2014-063525 filed Mar. 26, 2014, the entire contents of which are incorporated herein by reference.

BACKGROUND

The present technology relates to a storage device, an information processing device, a data access method and a program, particularly, to a storage device, an information processing device, a data access method and a program by which files can be transferred at a high speed.

A storage device to which a FAT file system is applied is used, in which the FAT file system manages files on a recording medium using a so-called file allocation table (FAT) (for example, refer to Japanese Patent No. 4736594).

In the FAT file system, a recording region of the recording medium is managed by a unit of cluster, and a usage status of each cluster is recorded in the FAT. When access is gained to the files on the recording medium, a cluster chain is analyzed, the cluster chain being indicative of connection of the clusters that configure the files (for example, refer to Microsoft "The FAT File System", [online], [searched on Mar. 20, 2014], Internet <URL:http://social.technet.microsoft.com/wiki/contents/articles/6771.the-fat-file-system.aspx>).

SUMMARY

However, when the cluster chain is analyzed, access is frequently gained to a storage device from a central processing unit (CPU) of host equipment for gaining access to the files.

This is not a problem with a high-speed CPU of a typical personal computer (PC) or the like; however, in a case where a low-speed CPU for embedded purpose or the like is used, it takes time to analyze the cluster chain due to overhead associated with the reading and writing of the medium or the calling of a controller control function of software when file access is gained. For this reason, even though a data read speed and a data write speed increase, a file transfer speed does not increase much, and it is difficult for a user to benefit from an increase in the data read speed and the data write speed.

It is desirable to be able to transfer files at a high speed.

According to an embodiment of the present technology, there is provided a storage device including a recording medium in which data is recorded on a cluster basis; and a memory that stores a FAT in which disposition information regarding a cluster is recorded.

The storage device according to the embodiment of the present technology may further include an interface through which access is gained to the FAT stored in the memory from an information processing device that gains access to a file recorded in the recording medium.

In the storage device according to the embodiment of the present technology, the interface may be formed of an address line for designating an address for data stored in the memory, and a data line for gaining access to data for a designated address, and the information processing device may acquire the disposition information recorded in the FAT by gaining access, via the data line, to data for an address that is designated via the address line.

In the storage device according to the embodiment of the present technology, the information processing device may acquire the disposition information recorded in the FAT by gaining access to an address that is obtained using a cluster number for the cluster and byte counts that are occupied by a piece of the disposition information in the memory.

In the storage device according to the embodiment of the present technology, the information processing device may perform the DMA transfer of data recorded in the recording medium using a direct memory access (DMA) descriptor that is generated based on the acquired disposition information.

According to another embodiment of the present technology, there is provided an information processing device that is associated with a storage device that includes a recording medium in which data is recorded on a cluster basis, and a memory that stores a FAT in which disposition information regarding a cluster is recorded, the device includes a control unit that gains access to a file recorded in the recording medium; and an interface through which access is gained to the FAT stored in the memory.

In the information processing device according to the embodiment of the present technology, the interface may be formed of an address line for designating an address for data stored in the memory, and a data line for gaining access to data for a designated address, and the control unit may acquire the disposition information recorded in the FAT by gaining access to, via the data line, data for an address that is designated via the address line.

In the information processing device according to the embodiment of the present technology, the control unit may acquire the disposition information recorded in the FAT by gaining access to an address that is obtained using a cluster number for the cluster and byte counts which are occupied by a piece of the disposition information in the memory.

The information processing device according to the embodiment of the present technology may further include a DMA controller that performs the DMA transfer of data recorded in the recording medium using a DMA descriptor that is generated based on the acquired disposition information.

According to a still another embodiment of the present technology, there is provided a data access method, in which a storage device includes a recording medium in which data is recorded on a cluster basis, and a memory that stores a FAT in which disposition information regarding a cluster is recorded, and in which an information processing device that includes a control unit which gains access to a file recorded in the recording medium, and an interface through which access is gained to the memory, the method including gaining access to the FAT stored in the memory via the interface using the control unit.

According to still another embodiment of the present technology, there is provided a program, in which a storage device includes a recording medium in which data is recorded on a cluster basis, and a memory that stores a FAT in which disposition information regarding a cluster is recorded, and in which a computer includes a control unit which gains access to a file recorded in the recording medium, and an interface through which access is gained to the memory, the program causing the computer to execute gaining access to the FAT stored in the memory via the interface.

According the embodiment of the present technology, access is gained to the FAT stored in the memory via the interface through which access is gained to the memory that stores the FAT in which the disposition information regarding the cluster is recorded.

According to the embodiments of the present technology, a file can be transferred at a higher speed.

BRIEF DESCRIPTION OF THE DRAWINGS

FIG. 7 is a diagram illustrating the FAT stored in a memory; and

DETAILED DESCRIPTION OF EMBODIMENTS

Hereinafter, an embodiment of the present technology will be described with reference to the accompanying drawings. The description will be given in the following sequence.

1. Configuration and Operation of Host Equipment and Storage Device in Related Art
2. Configuration of Host Equipment and Storage Device According to Present Technology
3. Analysis of Cluster Chain and DMA Descriptor Generation Process According to Present Technology.

1. Configuration and Operation of Host Equipment and Storage Device in Related Art FIG. 1 illustrates an example of the configuration of host equipment and a storage device in the related art.

Figure 1:
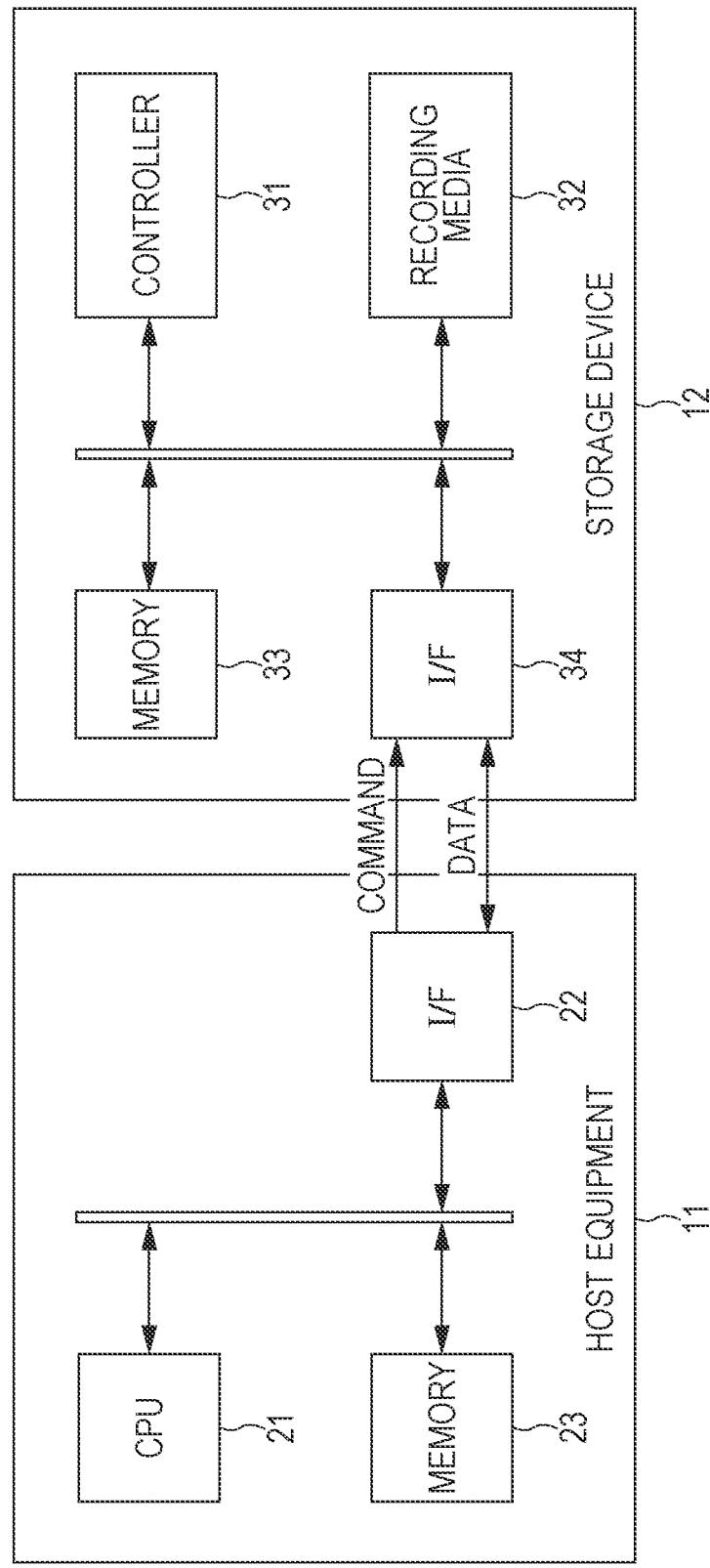
FIG. 1 is a block diagram illustrating an example of the configuration of host equipment and a storage device in the related art.

For example, in the configuration illustrated in FIG. 1, when host equipment 11 reads data stored in a recording medium 32 of a storage device 12, first, a CPU 21 of the host equipment 11 issues a command to the storage device 12 via an interface (I/F) 22. A controller 31 of the storage device 12 reads data in the recording medium 32 based on the command that is received from the host equipment 11 via an I/F 34. The controller 31 transmits the read data to the host equipment 11 via the I/F 34 while using a memory 33 as a cache as necessary. The CPU 21 of the host equipment 11 stores the data received via the I/F 22 on a memory 23.

The data stored in the recording medium 32 is read in this manner. Also, when the host equipment 11 writes data in the recording medium 32 of the storage device 12, the data is written in the recording medium 32 in the same manner as in the above-mentioned case.

Typically, when a CPU gains access to a recording medium such as a hard disk, the access is gained on a fixed-length (for example, 32K bite) block (the block being referred to as a cluster and a minimum logical unit) basis. When logical formatting is done, the storage device divides the entire storage region of the recording medium into clusters, assigns a cluster number to each of the divided storage regions, and manages the divided storage regions.

In contrast, an application or the like handled by a user gains access to data (for example, image data exceeding several megabytes) stored in the recording medium on a file basis. For this reason, when a file is read, it is necessary to specify which cluster stores the file, using separately managed file information.

Typically, a FAT file system is used as a technique of managing such a file information.

In the FAT file system, a specific region in the recording medium contains a FAT that stores a usage status of a cluster or information (hereinafter, referred to as disposition information) indicative of the disposition of a cluster, and a directory entry that stores a file name of a file in the recording medium, and a first cluster number for a cluster which stores first data.

Regarding File Access Using Directory Entry and FAT

Figure 2:
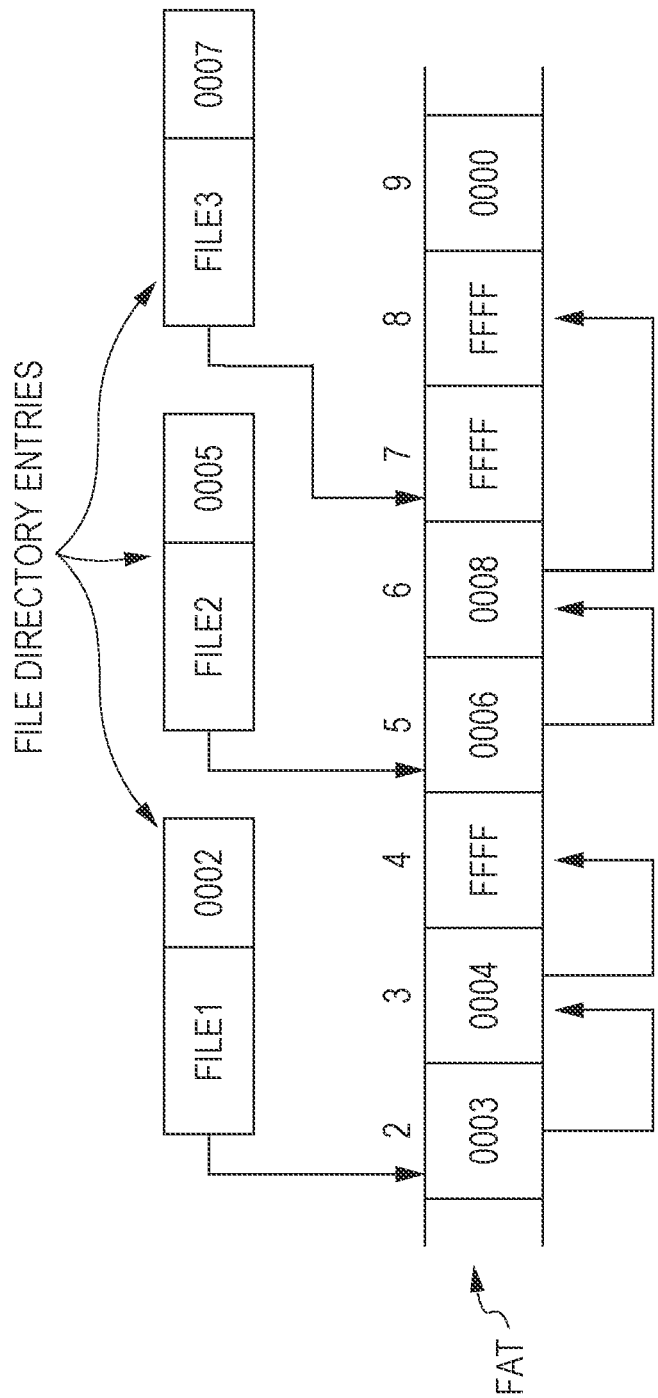
FIG. 2 is a diagram illustrating file access that is gained using directory entries and a FAT disclosed in Microsoft "The FAT File System", [online], [searched on Mar. 20, 2014], Internet <URL:http://social.technet.microsoft.com/wiki/contents/articles/6771.the-fat-file-system.aspx>.

FIG. 2 is a diagram illustrating file access that is gained using the directory entry and the FAT disclosed in Microsoft "The FAT File System", [online], [searched on Mar. 20, 2014], Internet <URL:http://social.technet.microsoft.com/wiki/contents/articles/6771.the-fat-file-system.aspx>.

In FIG. 2, for example, when access is gained to a file having a file name referred to as "File 1", a first cluster number 0002 is acquired, which is recorded in a directory entry of the file. This implies that first data of "File 1" is stored in a cluster 2.

In the FAT, when a cluster is not used, "0000" is recorded as disposition information regarding the cluster in the corresponding region with a cluster number. When the cluster is used and is not a final cluster of the file, a cluster number for a subsequent cluster is recorded in the cluster, and when the cluster is the final cluster of the file, "FFFF" is recorded in the cluster.

That is, in the example illustrated in FIG. 2, based on the first cluster number 0002 recorded in the directory entry, a cluster number 0003 is acquired, which is recorded in the region of the FAT for the cluster number 2. This implies that second data is recorded in a cluster 3, which is subsequent to the first data of "File 1" recorded in the cluster 2.

Subsequently, based on the cluster number 0003 recorded in the region of the FTA for the cluster number 2, a cluster number 0004 is acquired, which is recorded in the region of the FAT for the cluster number 3. This implies that third data is recorded in a cluster 4, which is subsequent to the second data of "File 1" recorded in the cluster 3.

A cluster number FFFF is acquired, which is recorded in the region of the FAT for the cluster number 4, based on the cluster number 0004 recorded in the region of the FTA for the cluster number 3. This implies that the data recorded in the cluster 4 is final data of "File 1".

In this manner, access is repeatedly gained to the FAT recorded in the specific region in the recording medium, and thereby the cluster numbers of the entirety of the clusters are acquired, in which the data of "File 1" is recorded.

A cluster chain refers to a series of clusters in which data of one file is recorded, and when file access is gained, the cluster chain is analyzed in the above-mentioned sequence, based on disposition information recorded in the FAT.

In the related art, when data is transferred from the recording medium 32 to the host equipment 11, the CPU 21 does not perform the data transfer between the clusters in the recording medium 32 and the memory 23, and instead, the data transfer (DMA transfer) is performed via direct memory access (DMA).

In the DMA, based on a list of clusters in which data to be transferred is recorded, the CPU 21 generates a DMA descriptor as transfer information, and supplies the DMA descriptor to a DMA controller (not illustrated). The DMA controller performs the DMA transfer of the data using the DMA descriptor.

It is possible to reduce a load of the CPU 21 by performing the DMA transfer in this manner.

Flow of File Access Process

Figure 3:
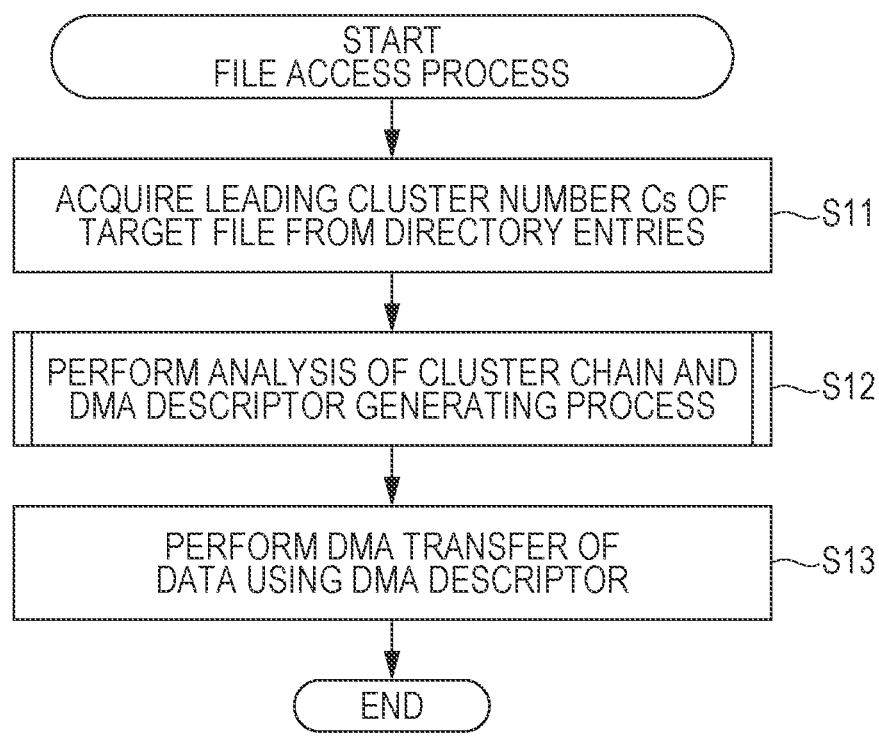
FIG. 3 is a flowchart illustrating a file access process.

Here, a flow of a file access process will be described with reference to a flowchart illustrated in FIG. 3. Here, it is assumed that a file is read.

In step S11, a first cluster number Cs of a file (the target for access) is acquired from a directory entry.

In step S12, the analysis of a cluster chain and the DMA descriptor generation process are performed.

In step S13, the DMA transfer of data is performed using a generated DMA descriptor.

Details of Analysis of Cluster Chain and DMA Descriptor Generation Process

Figure 4:
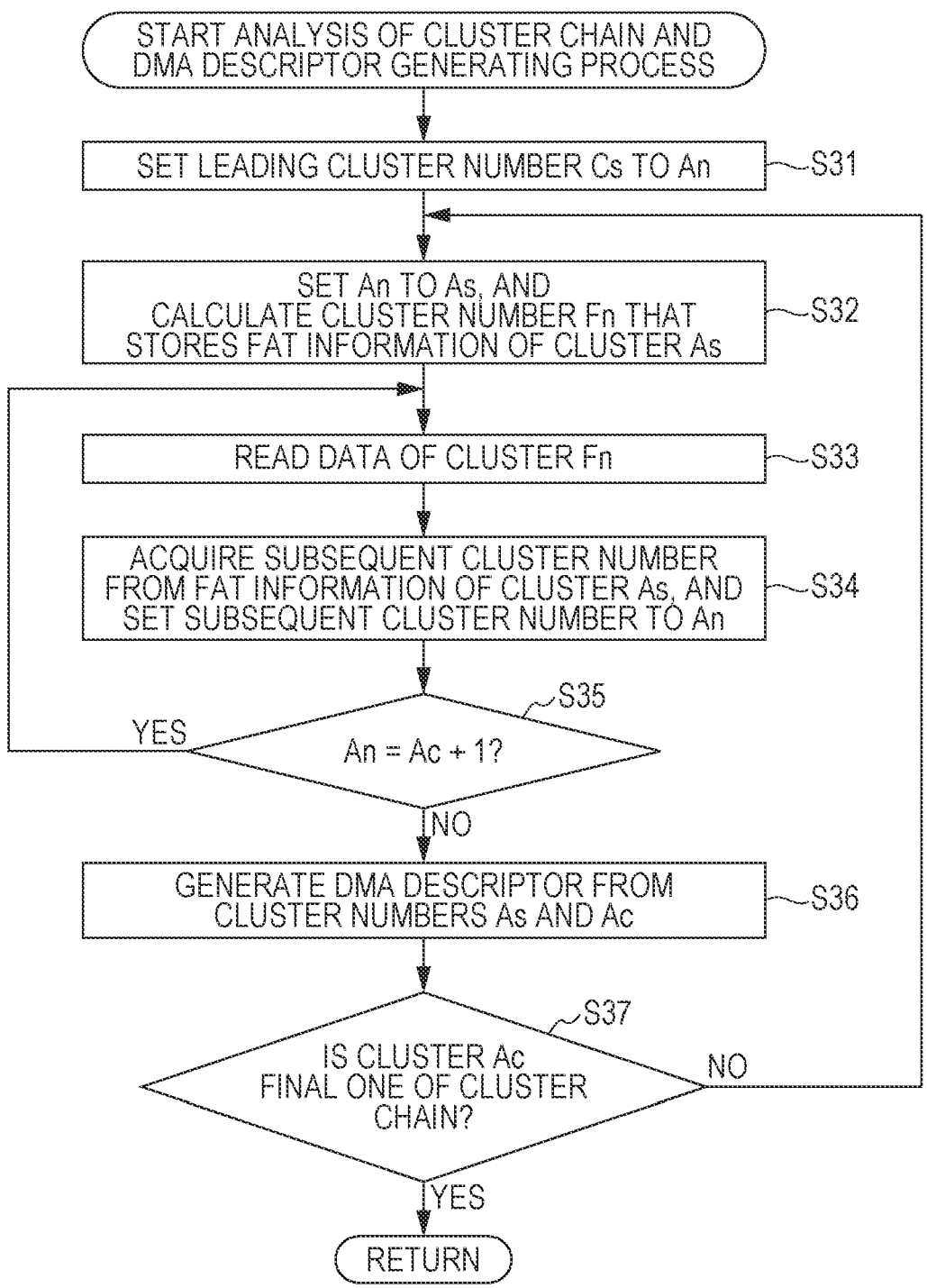
FIG. 4 is a flowchart illustrating the analysis of a cluster chain and a DMA descriptor generation process.

Subsequently, the analysis of a cluster chain and the DMA descriptor generation process illustrated in step S12 of the flowchart in FIG. 3 will be described in detail with reference to the flowchart illustrated in FIG. 4.

In step S31, the first cluster number Cs is set to a cluster number An.

In step S32, the cluster number An is set to a first cluster number As of a cluster chain to be analyzed, and a cluster number Fn of a region (cluster) is calculated, in which FAT (hereinafter, referred to as FAT information) of a cluster As in the recording medium is recorded.

In step S33, data of a cluster Fn is read in the recording medium, the cluster Fn being indicated by the cluster number Fn.

In step S34, a subsequent cluster number subsequent to a cluster number Ac (number of a cluster of interest, and initially, the first cluster number As is set to the number of a cluster of interest) of a cluster of interest is acquired from the FAT information regarding the cluster As indicated by the read data, and the subsequent cluster number is set to An.

In step S35, it is determined whether An is equal to Ac+1, that is, whether the number of a cluster of interest Ac and the subsequent cluster number An are consecutive. When the number of a cluster of interest Ac and the subsequent cluster number An are consecutive, the process returns to step S33, and the subsequent cluster number An is set to the number of a cluster of interest Ac, and the processes in steps S33 and S34 are repeated.

In contrast, when the number of a cluster of interest Ac and the subsequent cluster number An are not consecutive, the process proceeds to step S36, and a DMA descriptor is generated from the first cluster number As and the number of a cluster of interest Ac. The DMA descriptor is information for transferring the consecutive clusters that correspond to the first cluster number As to the number of a cluster of interest.

In step S37, it is determined whether the cluster (the cluster Ac) with the number of a cluster of interest Ac is a final cluster of the cluster chain, that is, whether the cluster with the number of a cluster of interest Ac is a final cluster among the clusters of the file (the target for access).

When the cluster Ac is not the final cluster of the cluster chain, the process returns to step S32, and the above-mentioned process is repeated. In contrast, when the cluster Ac is the final cluster of the cluster chain, the analysis of a cluster chain and the DMA descriptor generation process are completed.

In steps S32 and S33 of the above-mentioned process, in order to analyze a cluster chain, access is frequently gained to a file to the recording medium of the storage device from the CPU of the host equipment for gaining access.

This is not a problem with a high-speed CPU of a typical PC or the like; however, in a case where a low-speed CPU for embedded purpose or the like is used, it takes time to analyze a cluster chain due to overhead that is associated with the reading and writing of the medium or the calling of a controller control function of software when file access is gained.

For this reason, in a storage device having a transfer execution speed of several Gb/s, the time necessary to analyze a cluster chain becomes several times (for example, 10 seconds or longer) an actual transfer speed (for example, 3 seconds), and it is difficult for a user to benefit from an improvement in file transfer speed.

It is considered that when a memory of host equipment reads the entirety of FAT in advance, this problem is resolved; however, the size of FAT in a large capacity (for example, 32 GB) of SD memory card typically used is several megabytes (for example, 8 MB), and it is not a typical approach to ensure a memory with this capacity for the CPU used for embedded purpose.

Hereinafter, a configuration for reducing the time necessary to analyze a cluster chain and performing high-speed file transfer will be described.

2. Configuration of Host Equipment and Storage Device According to Present Technology FIG. 5 illustrates an example of the configuration of host equipment and a storage device according to the present technology.

Figure 5:
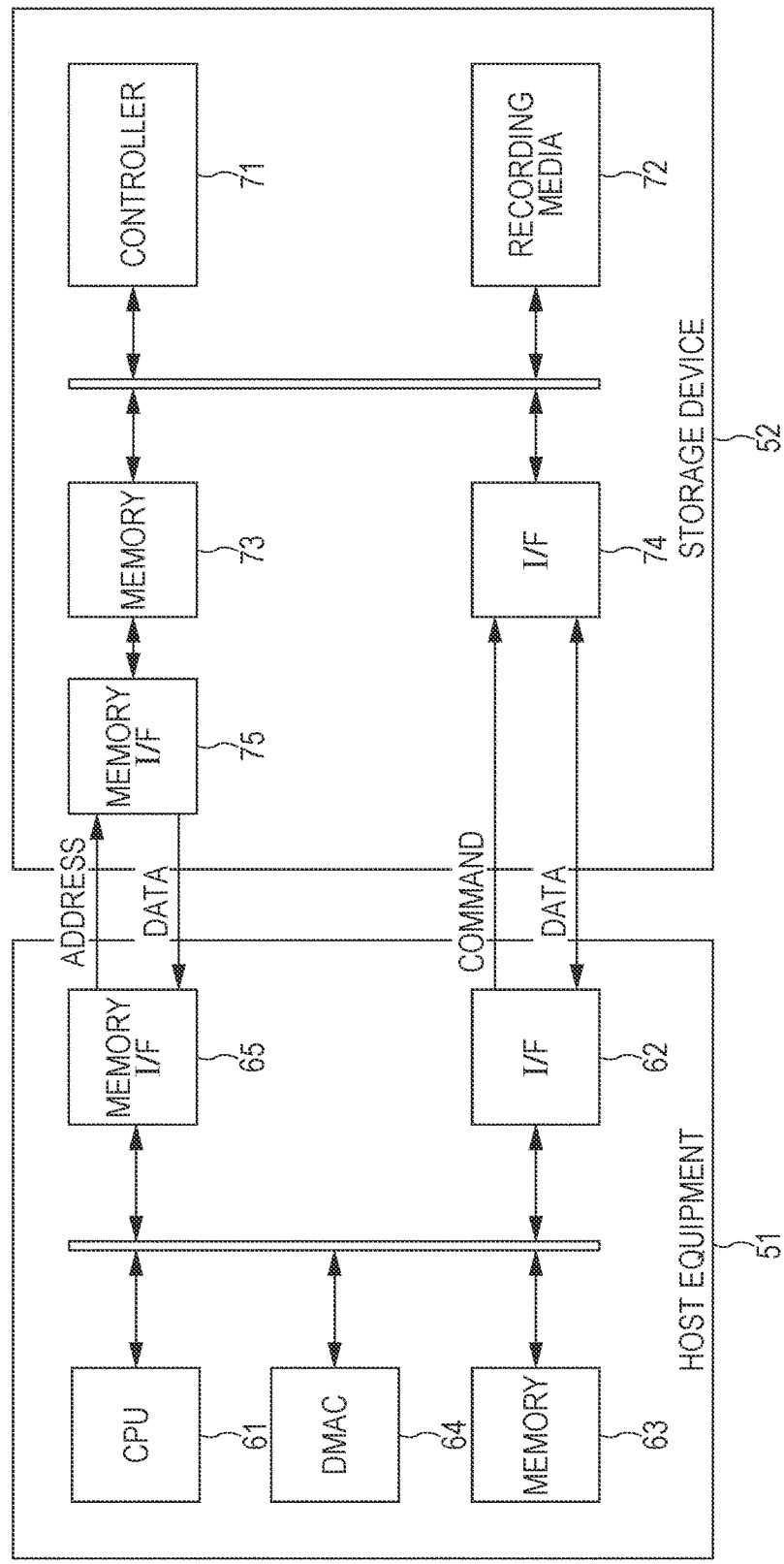
FIG. 5 is a block diagram illustrating an example of the configuration of host equipment and a storage device according to an embodiment of the present technology.

In a data access system configured to include host equipment 51 and a storage device 52 illustrated in FIG. 5, the host equipment 51 gains access to data recorded in the storage device 52.

The host equipment 51 is application equipment such as a video camera, a digital camera, or a music player for replaying data recorded in the storage device 52. In addition, the host equipment 51 may be a personal computer (PC) or the like. The storage device 52 may be a composite storage device that includes a disk-like recording medium, and a non-volatile recording medium such as a flash memory. The storage device 52 is not limited to that configuration, and may have another configuration.

The host equipment 51 includes a CPU 61; an I/F 62; a memory 63; a DMA controller (DMAC) 64; and a memory I/F 65, and the storage device 52 includes a controller 71; a recording medium 72; a memory 73; an I/F 74; and a memory I/F 75.

In the host equipment 51, the CPU 61 performs predetermined computational processes, issues a command, and gains access to data recorded in the recording medium 72 of the storage device 52 via the I/F 62.

The memory 63 is used for the computational processes of the CPU 61.

The DMAC 64 performs the DMA transfer of data recorded in the recording medium 72 of the storage device 52, using a DMA descriptor generated by the CPU 61.

The memory I/F 65 is an I/F for gaining access to the memory 73 of the storage device 52, and is formed of an address line for designating an address (memory address) for data stored in the memory 73, and a data line for gaining access to the data for the designated address.

In the storage device 52, the controller 71 performs predetermined computational processes, receives a command issued by the host equipment 51 via the I/F 74, and controls the access of the host equipment 51 to the data recorded in the recording medium 72, based on the command. According to the format of the FAT file system, data is recorded in the recording medium 72 such as a hard disk on a cluster basis.

The memory 73 is used for the computational processes of the controller 71. The memory 73 stores a FAT in which disposition information regarding a cluster is recorded in the recording medium 72. The memory 73 is a non-volatile recording medium such as a flash memory; however, the memory 73 may be a volatile recording medium such as a dynamic random access memory (DRAM). In this case, when the storage device 52 is turned on, the memory 73 reads the FAT.

The memory I/F 75 is an I/F through which the host equipment 51 gains access to the memory 73, and is formed of an address line for designating an address for data stored in the memory 73, and a data line for gaining access to the data for the designated address.

In this configuration, via the data line, the CPU 61 of the host equipment 51 gains access to data for the address that is designated via the respective address lines the memory I/F 65 and the memory I/F 75, and thereby the CPU 61 can acquire disposition information recorded in the FAT stored in the memory 73.

The directory entry may be stored in the memory 73 along with the FAT, and may be stored in a specific region in the recording medium 72.

Here, basically, the file access process of the host equipment 51 and the storage device 52 is performed similar to that described with reference to the flowchart in FIG. 3. In the host equipment 51 and the storage device 52, the analysis of a cluster chain and the DMA descriptor generation process are respectively different from those described with reference to the flowchart in FIG. 4, in that access is not frequently gained to the recording medium 72 from the CPU 61 when a cluster chain is analyzed.

Figure 6:
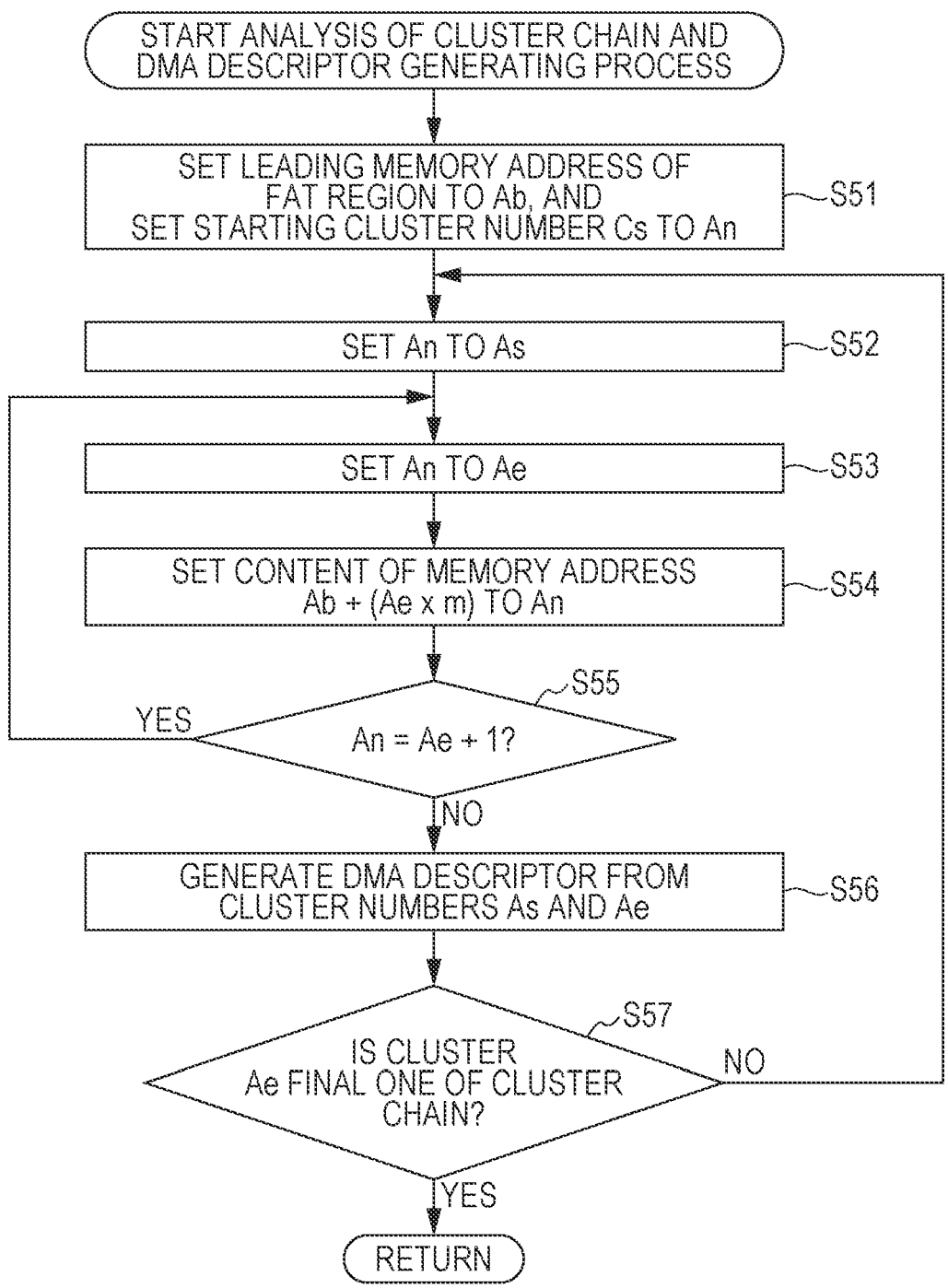
FIG. 6 is a flowchart illustrating the analysis of a cluster chain and a DMA descriptor generation process according to the embodiment of the present technology.

3. Analysis of Cluster Chain and DMA Descriptor Generation Process According to Present Technology FIG. 6 is a flowchart illustrating the analysis of a cluster chain and a DMA descriptor generation process according to the present technology.

In step S51, the CPU 61 sets a first memory address of a FAT storage region (FAT region) of the memory 73 to a reference address Ab, and the first cluster number Cs of a file (the target for access) to the cluster number An.

In step S52, the CPU 61 sets the cluster number An to the first cluster number As of a cluster chain to be analyzed.

In step S53, the CPU 61 sets the cluster number An to a provisional final cluster number Ae of a cluster that is provisionally final in the cluster chain to be analyzed.

In step S54, the CPU 61 acquires the content of a memory address Ab+(Ae×m) in the memory 73, and sets the content to the cluster number An. Here, m indicates byte counts that are occupied by the dispositional region of one cluster in a FAT stored in the memory 73.

FIG. 7 is a diagram illustrating the FAT stored in the memory 73.

In FIG. 7, d is a first address of the FAT region in the memory 73, and in the FAT region, d+(i×m) is a memory address of the region in which disposition information regarding a cluster number i is recorded.

When the first cluster number Cs is assumed to be "0002", the cluster number 2 is set to the provisional final cluster number Ae, and thereby access is gained to data for a memory address d+(2×m). In the example illustrated in FIG. 7, the cluster number 0003 is recorded in the region of the memory address d+(2×m), and the cluster number 0003 is acquired, and is set to the cluster number An.

Returning to the flowchart in FIG. 6, in step S55, the CPU 61 determines whether An is equal to Ae+1, that is, whether the provisional final cluster number Ae and the cluster number An are consecutive. When the provisional final cluster number Ae and the cluster number An are consecutive, the process returns to step S53, the cluster number An is set to the provisional final cluster number Ae, and the process in step S54 is repeated.

For example, in the example illustrated in FIG. 7, in step S55, it is determined that the cluster number 2 set to the provisional final cluster number Ae and the cluster number 0003 set to the cluster number An are consecutive. The process returns to step S53, the cluster number 3 is set to the provisional final cluster number Ae, and in step S54, the content of a memory address d+(3×m), that is, the cluster number 0004, is acquired, and is set to the cluster number An.

In step S55, it is determined that the cluster number 3 set to the provisional final cluster number Ae and the cluster number 0004 set to the cluster number An are consecutive. The process returns to step S53, the cluster number 4 is set to the provisional final cluster number Ae, and in step S54, the content of a memory address d+(4×m), that is, "FFFF", is acquired, and is set to the cluster number An.

In this case, in step S55, it is determined that the cluster number 4 is set to the provisional final cluster number Ae and "FFFF" set to the cluster number An are not consecutive, and the process proceeds to step S56.

In step S56, the CPU 61 generates a DMA descriptor from the first cluster number As and the provisional final cluster number Ae. The DMA descriptor is information that the DMAC 64 uses so as to transfer the consecutive clusters that correspond to the first cluster number As to the provisional final cluster number Ae. In the example illustrated in FIG. 7, the DMA descriptor is generated so as to transfer the consecutive clusters that correspond to the cluster number 2 to the cluster number 4.

In step S57, the CPU 61 determines whether the cluster (the cluster Ae) with the cluster number Ae is a final cluster of the cluster chain, that is, whether the cluster with the cluster number Ae is a final cluster among the clusters of the file (the target for access).

When the cluster Ae is not the final cluster of the cluster chain, the process returns to step S52, and the above-mentioned process is repeated for the subsequent consecutive clusters. In contrast, for example, when the cluster Ae is the final cluster of the cluster chain like the cluster with the cluster number 4 in FIG. 7, the analysis of a cluster chain and the DMA descriptor generation process are completed.

According to the above-mentioned process, when a cluster chain is analyzed, disposition information recorded in a FAT stored in a memory of a storage device is acquired via access to a memory address that is obtained by pointer computation using a cluster number and byte counts that are occupied by one dispositional region in the FAT stored in the memory of the storage device. Accordingly, when a cluster chain is analyzed, access is not frequently gained to a recording medium of the storage device from a CPU of host equipment for gaining access to a file, a controller control function in software is not called, and it is possible to reduce the time necessary to analyze the cluster chain even when a low-speed CPU for embedded purpose is used.

For example, according to the processes of the present technology, it is possible to reduce the time necessary to analyze a cluster chain to 1 second or shorter, compared to 10 seconds or longer that it takes to analyze a cluster chain according to the processes in the related art, and as a result, it is possible to transfer a file at a higher speed.

The data access system illustrated in FIG. 5 may not be provided with the memory I/F 65 and the memory I/F 75. In this case, the data access system may have overhead due to the calling of a controller control function; however, it is possible to gain memory access at a higher speed in medium access for the analysis of a cluster chain, and it is possible to reduce overhead originating from the reading and the writing of the medium.

It is possible to execute a series of the above-mentioned processes via software and hardware. When a series of the processes are executed via software, a program of the software is installed in a computer. Here, the computer may be a computer into which exclusive hardware is assembled, a general purpose personal computer that can execute various functions when various programs are installed therein, or the like.

Figure 8:
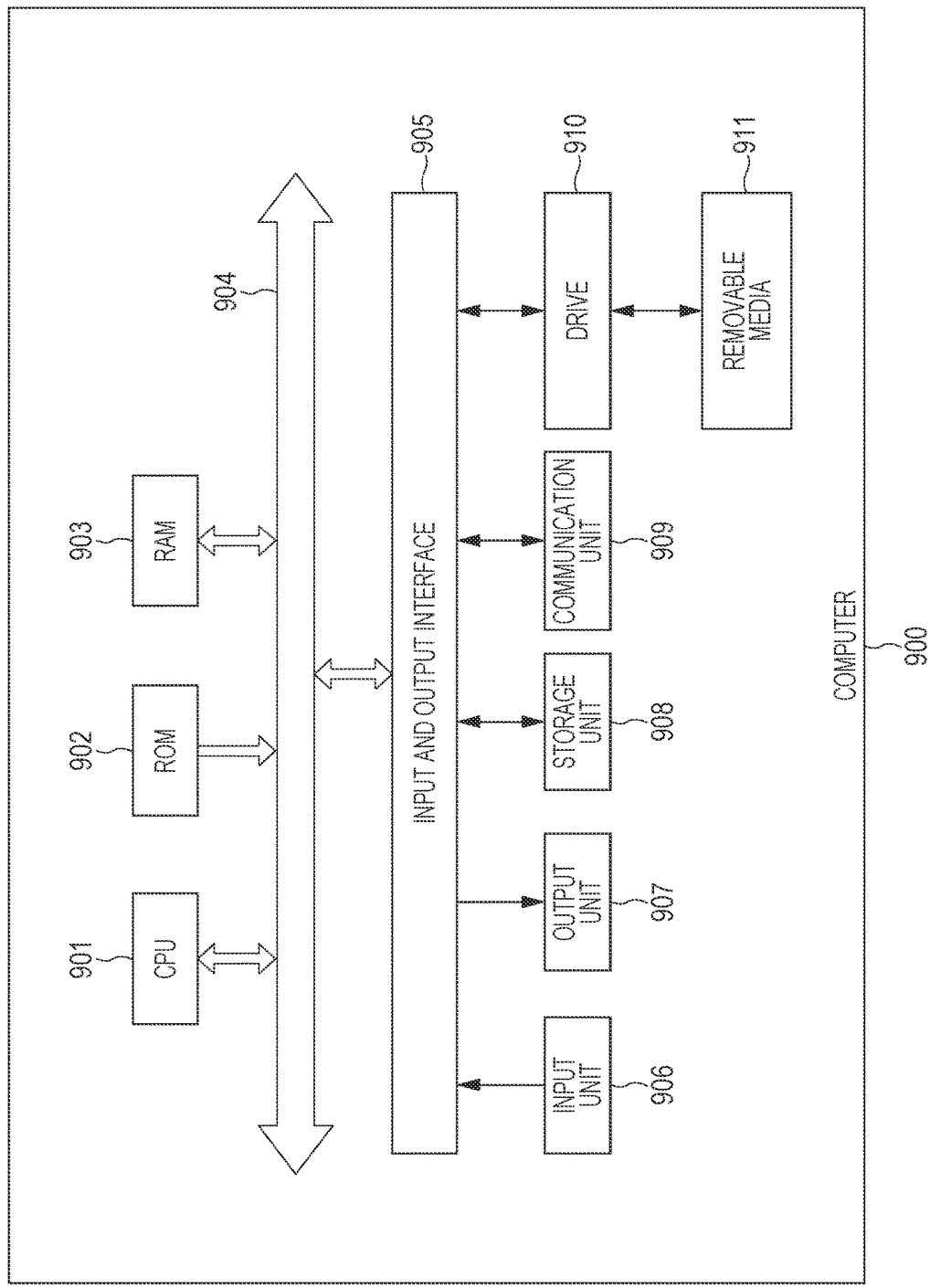
FIG. 8 is a block diagram illustrating an example of the configuration of hardware of a computer.

FIG. 8 is a block diagram illustrating an example of the configuration of hardware of a computer that executes a series of the above-mentioned processes of the host equipment 51 by means of a program.

In a computer 900, a central processing unit (CPU) 901, a read only memory (ROM) 902, and a random access memory (RAM) 903 are connected to each other via a bus 904.

The bus 904 is connected to an input and output interface 905. An input unit 906, an output unit 907, and a storage unit 908, a communication unit 909, and a drive 910 are connected to the input and output interface 905.

The input unit 906 is a keyboard, a mouse, a microphone, or the like. The output unit 907 is a display, a speaker, or the like. The storage unit 908 is a hard disk, a non-volatile memory, or the like. The communication unit 909 is a network interface or the like. The drive 910 drives a removable medium 911 such as a magnetic disk, an optical disc, a magneto-optical disk, a semiconductor memory, or the like.

In the computer 900 with the above-mentioned configuration, for example, the CPU 901 loads the program stored in the storage unit 908 in the RAM 903 via the input and output interface 905 and the bus 904, and performs a series of processes by executing the program.

For example, the program executed by the computer 900 (the CPU 901) can be supplied while being recorded in the removable medium 911 such as a package medium. In addition, the program can be supplied via a wired or wireless transfer medium such as a local area network, Internet, or digital satellite broadcasting.

In the computer 900, it is possible to install the program in the storage unit 908 via the input and output interface 905 by mounting the removable medium 911 on the drive 910. In addition, the communication unit 909 can receive the program via a wired or wireless transfer medium, and the program can be installed in the storage unit 908. In another method, it is possible to install the program in the ROM 902 or the storage unit 908 in advance.

The program executed by the computer 900 may execute processes in time series according to the sequence described in this specification, or the program may execute processes in parallel or whenever necessary, for example, when a call is made.

The present technology is not limited to the above-mentioned embodiment, and various modifications can be made to the present technology insofar as the modifications do not depart from the spirit of the present technology.

For example, the present technology can have a cloud computing configuration in which one function is shared between and is cooperatively processed by a plurality of apparatuses via a network.

Each of the steps in the above-mentioned flowcharts can be shared between and be executed by not only one apparatus but also a plurality of apparatuses.

In addition, when a single step includes a plurality of processes, the plurality of processes included in the single step can be shared between and be executed by not only one apparatus but also a plurality of apparatuses.

The present technology can have the following configurations.

(1) A storage device includes a recording medium in which data is recorded on a cluster basis, and a memory that stores a file allocation table (FAT) in which disposition information regarding a cluster is recorded.

(2) The storage device according to (1) further includes an interface through which access is gained to the FAT stored in the memory from an information processing device that gains access to a file recorded in the recording medium.

(3) In the storage device according to (2), the interface is formed of an address line for designating an address for data stored in the memory, and a data line for gaining access to data for a designated address, and the information processing device acquires the disposition information recorded in the FAT by gaining access, via the data line, to data for an address that is designated via the address line.

(4) In the storage device according to any one of (1) to (3), the information processing device acquires the disposition information recorded in the FAT by gaining access to an address that is obtained using a cluster number for the cluster and byte counts that are occupied by a piece of the disposition information in the memory.

(5) In the storage device according to any one of (1) to (4), the information processing device performs the DMA transfer of data recorded in the recording medium using a direct memory access (DMA) descriptor that is generated based on the acquired disposition information.

(6) An information processing device that is associated with a storage device including a recording medium in which data is recorded on a cluster basis, and a memory that stores a file allocation table (FAT) in which disposition information regarding a cluster is recorded, includes a control unit that gains access to a file recorded in the recording medium; and an interface through which access is gained to the FAT stored in the memory.

(7) In the information processing device according to (6), the interface is formed of an address line for designating an address for data stored in the memory, and a data line for gaining access to data for a designated address, and the control unit acquires the disposition information recorded in the FAT by gaining access to, via the data line, data for an address that is designated via the address line.

(8) In the information processing device according to (6) or (7), the control unit acquires the disposition information recorded in the FAT by gaining access to an address that is obtained using a cluster number for the cluster and byte counts which are occupied by a piece of the disposition information in the memory.

(9) The information processing device according to any one of (6) to (8) further includes a DMA controller that performs the DMA transfer of data recorded in the recording medium using a direct memory access (DMA) descriptor that is generated based on the acquired disposition information.

(10) A data access method, in which a storage device includes a recording medium in which data is recorded on a cluster basis, and a memory that stores a file allocation table (FAT) in which disposition information regarding a cluster is recorded, and in which an information processing device includes a control unit which gains access to a file recorded in the recording medium, and an interface through which access is gained to the FAT stored in the memory, includes gaining access to the FAT stored in the memory via the interface using the control unit.

(11) A program, in which a storage device includes a recording medium in which data is recorded on a cluster basis, and a memory that stores a file allocation table (FAT) in which disposition information regarding a cluster is recorded, and in which a computer includes a control unit which gains access to a file recorded in the recording medium, and an interface through which access is gained to the FAT stored in the memory, causes the computer to execute processes that include gaining access to the FAT stored in the memory via the interface.

It should be understood by those skilled in the art that various modifications, combinations, sub-combinations and alterations may occur depending on design requirements and other factors insofar as they are within the scope of the appended claims or the equivalents thereof.

What is claimed is:

1. A storage device comprising:
   a recording medium that is configured to record data on a cluster basis;
   a memory that stores a file allocation table (FAT) having disposition information regarding the data that is recorded on the cluster basis, wherein the memory is separate from the recording medium, and wherein the memory does not store the data that is recorded on the cluster basis;
   a communication bus communicatively that directly connects the recording medium to the memory; and
   a memory interface directly connected to the memory, the memory interface configured to provide an information processing device access to the FAT stored in the memory.

2. The storage device according to claim 1, wherein the memory interface includes an address line and a data line, wherein the address line designates an address for data stored in the memory, and wherein the data line provides access to the data stored in the memory at the designated address.

3. The storage device according to claim 2, wherein the designated address includes a cluster number or a cluster and byte counts that are occupied by a piece of the disposition information stored in the memory.

4. The storage device according to claim 3, further comprising a second interface including a command line, the second interface is configured to receive a direct memory access (DMA) descriptor from the information processing device via the command line.

5. A system comprising:
   a storage device including:
      a recording medium that is configured to record data on a cluster basis,
      a memory that stores a file allocation table (FAT) having disposition information regarding the data that is recorded on the cluster basis, wherein the memory is separate from the recording medium, and wherein the memory does not store the data that is recorded on the cluster basis,
      a communication bus communicatively that directly connects the recording medium to the memory, and
      a memory interface directly connected to the memory, the memory interface configured to provide access to the FAT stored in the memory; and
   an information processing device including
      a control unit that is configured to gain access to a file recorded in the recording medium of the storage device, and
      a second memory interface that is configured to communicate with the memory interface of the storage device to access the FAT stored in the memory of the storage device.

6. The system according to claim 5, wherein communication between the memory interface and the second memory interface includes an address line and a data line, wherein the address line designates an address for data stored in the memory, wherein the data line provides access to the data stored in the memory at the designated address, and wherein the control unit is further configured to acquire the disposition information recorded in the FAT by gaining access, via the data line, to the data stored in the memory at the designated address.

7. The system according to claim 6, wherein the designated address includes a cluster number for a cluster and byte counts which are occupied by a piece of the disposition information stored in the memory.

8. The system according to claim 6, wherein the information processing device further includes a direct memory access (DMA) controller that is configured to perform a DMA transfer of a portion of the data that is recorded on the cluster basis in the recording medium of the storage device using a DMA descriptor, wherein the control unit is further configured to generate the DMA descriptor based on the acquired disposition information.

9. A data access method, the method comprising:
   designating, by a control unit of an information processing device, an address on an address line between a memory interface of the information processing device and a second memory interface of a storage device; and
   acquiring, by the control unit, disposition information of a file allocation table (FAT) stored in a memory of the storage device at the designated address via a data line between the memory interface of the information processing device and the second memory interface of the storage device, wherein the disposition information is regarding data that is recorded on a cluster basis in a recording medium of the storage device,
   wherein the memory is separate from the recording medium, wherein the memory does not store the data that is recorded on the cluster basis, wherein the memory is directly connected to the second memory interface, and wherein a communication bus of the storage device directly connects the mrmory to the recording medium.

10. A non-transitory computer readable medium storing a program comprising instructions executable by a processing unit to perform operations comprising:
    designating an address on an address line between a memory interface of an information processing device and a second memory interface of a storage device, and
    acquiring disposition information of a file allocation table (FAT) stored in a memory of the storage device at the designated address via a data line between the memory interface of the information processing device and the second memory interface of the storage device, wherein the disposition information is regarding data that is recorded on a cluster basis in a recording medium of the storage device, wherein the memory is separate from the recording medium, wherein the memory does not store the data that is recorded on the cluster basis, wherein the memory is directly connected to the second memory interface, and wherein a communication bus of the storage device directly connects the memory to the recording medium.

11. The non-transitory computer readable medium according to claim 10, wherein the designated address includes a cluster number for a cluster and byte counts which are occupied by a piece of the disposition information stored in the memory.

12. The non-transitory computer readable medium according to claim 10, further comprising instructions executable by the processing unit to perform the operations comprising:

generating a direct memory access (DMA) descriptor based on the acquired disposition information; and controlling a direct memory access controller (DMAC) to perform a DMA transfer of a portion of the data that is recorded on the cluster basis in the recording medium of the storage device using the DMA descriptor.

13. The data access method according to claim 9, wherein the designated address includes a cluster number for a cluster and byte counts which are occupied by a piece of the disposition information stored in the memory.

14. The data access method according to claim 9, further comprising:

generating, by the control unit, a direct memory access (DMA) descriptor based on the acquired disposition information; and controlling, by the control unit, a direct memory access controller (DMAC) to perform a DMA transfer of a portion of the data that is recorded on the cluster basis in the recording medium of the storage device using the DMA descriptor.

15. The storage device according to claim 1, further comprising a housing, wherein the recording medium and the memory are internally disposed within the housing.

16. The system according to claim 5, wherein the storage device has a first housing, and wherein the information processing device has a second housing that is different than the first housing.

17. The data access method according to claim 9, wherein the recording medium and the memory are internally disposed within a housing of the storage device.

* * * * *